Patented Mar. 16, 1926.

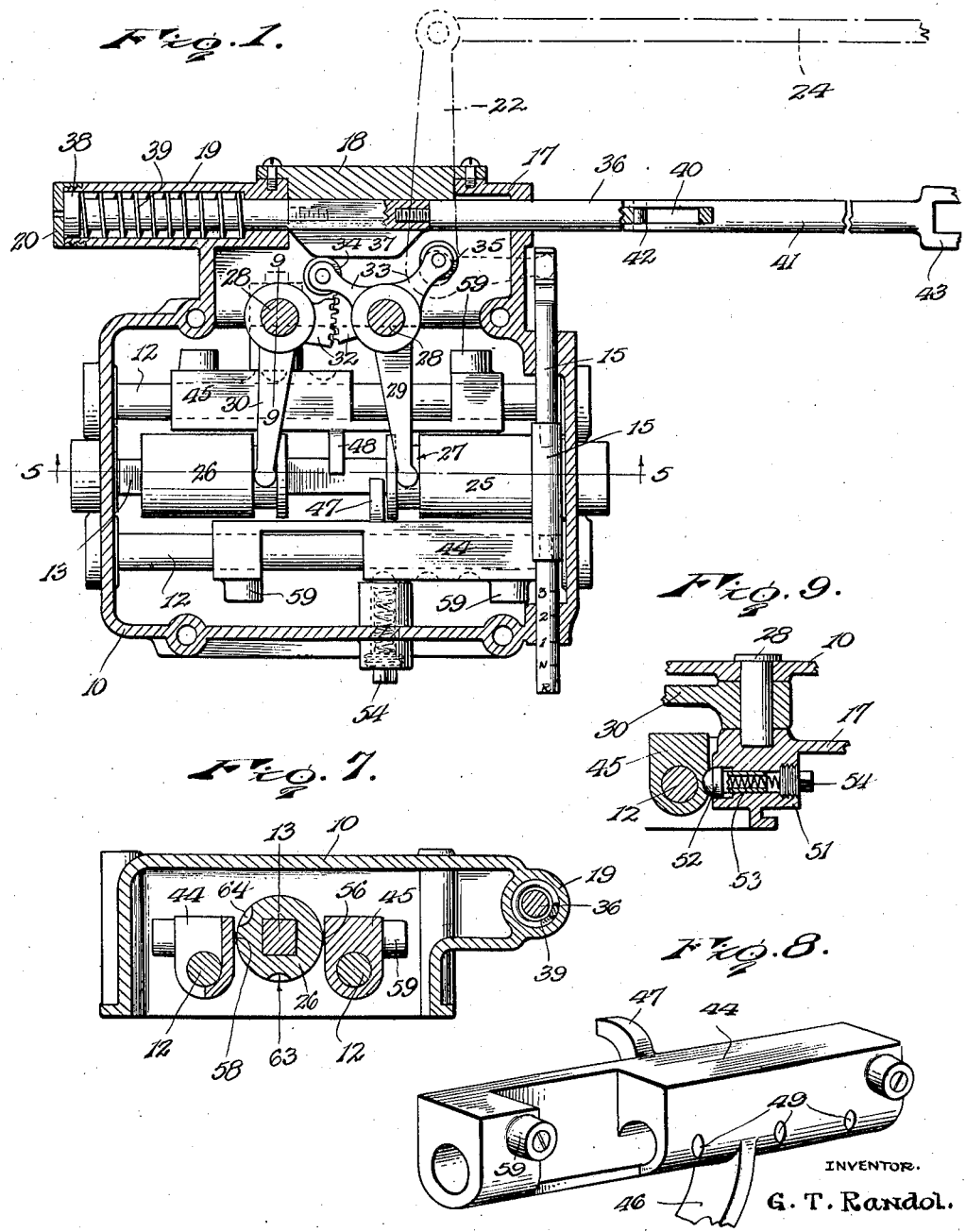

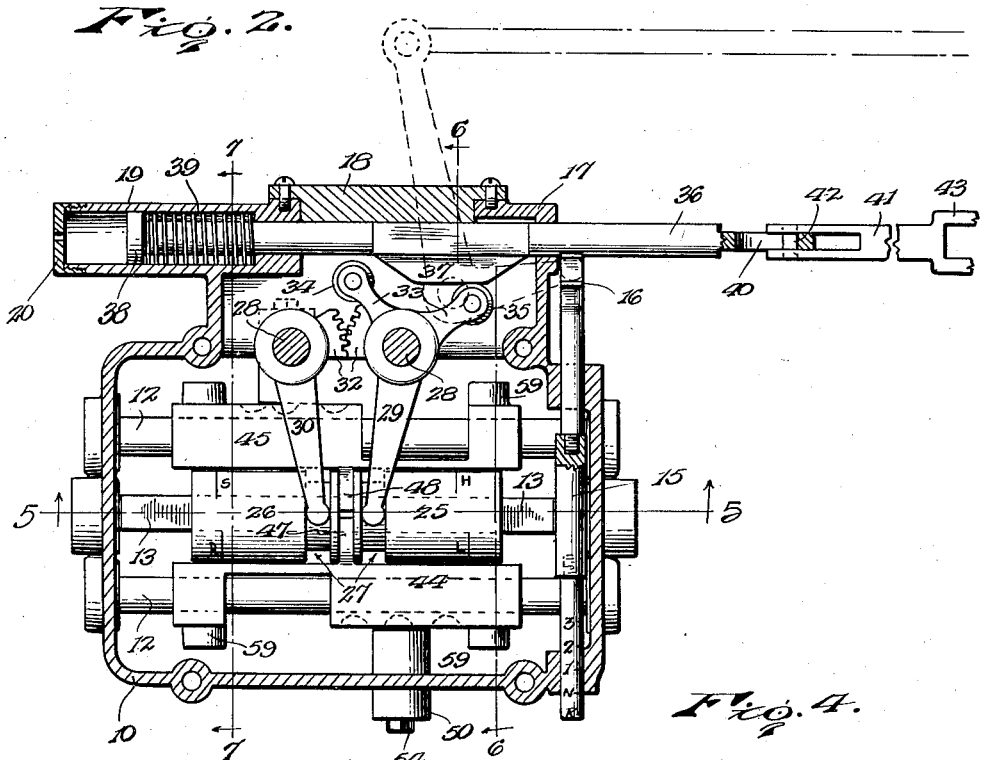

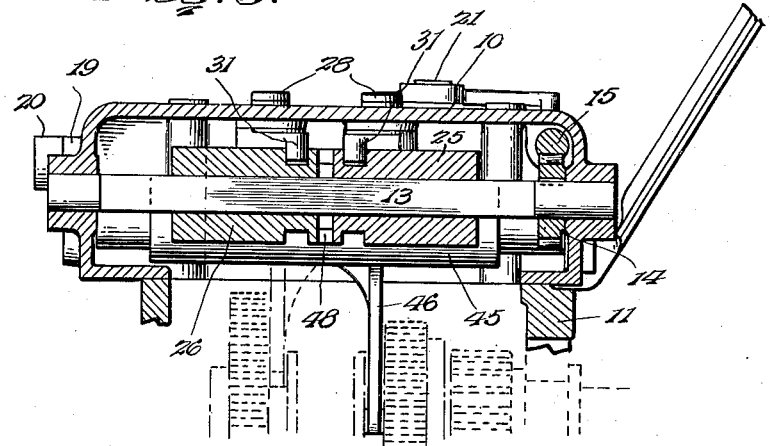
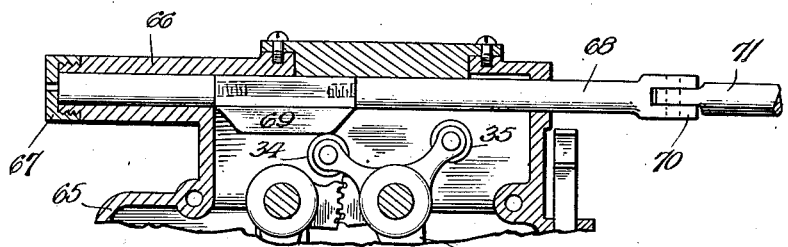
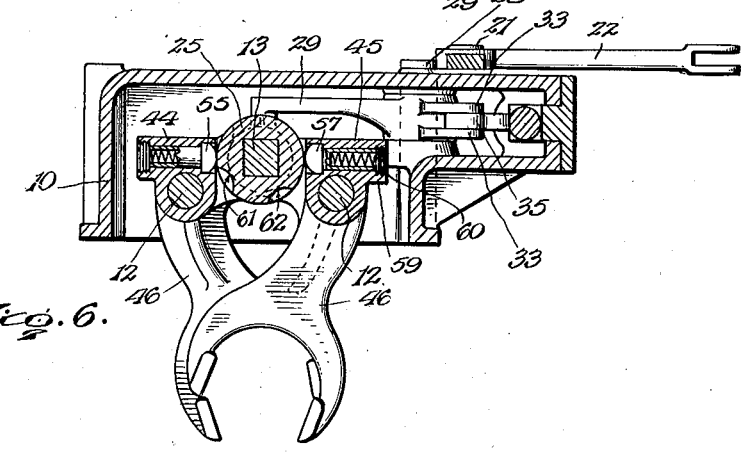

1,577,361

UNITED STATES PATENT OFFICE.

GLENN T. RANDOL, OF MARMADUKE, ARKANSAS, ASSIGNOR OF ONE-HALF TO SOL S. STEINBERG, OF PARAGOULD, ARKANSAS.

GEAR-SHIFTING MECHANISM.

Application filed July 5, 1923. Serial No. 649,685.

*To all whom it may concern:*

Be it known that I, GLENN T. RANDOL, a citizen of the United States, residing at Marmaduke, in the county of Greene and State of Arkansas, have invented certain new and useful Improvements in Gear-Shifting Mechanism, of which the following is a specification.

This invention relates to an improved motor vehicle gear shifting mechanism of the general character disclosed in my copending application for a similar invention, filed October 25, 1922, Serial No. 596,838, and seeks, among other objects, to provide a gear shifting mechanism which may be mounted upon the usual transmission case at the top thereof and which will be extremely compact and self-contained so as not to be in the way or interfere with the floor boards of a vehicle.

The invention seeks, as a further object, to provide a gear shifting mechanism operable by the clutch pedal to neutralize any gear selected and wherein but a short movement of the clutch pedal will be required to effect the neutralizing of the gear.

Another object is to provide a mechanism embodying power means to effect engagement of any gear selected and wherein said power means will be conveniently located.

A further object of the invention is to provide a gear shifting mechanism featured by the rapidity of the throw of the gears and wherein the mechanism will operate smoothly and without interruption to effect neutralizing of any gear or to effect engagement of any gear.

A still further object of the invention is to provide a mechanism which will operate without appreciable resistance on the clutch pedal to effect the neutralizing of any gear.

And the invention seeks, as a still further object, to provide a mechanism which will permit continued forward movement of the clutch pedal for its full throw after any gear has been neutralized so that the mechanism will thus not hamper free actuation of the pedal.

Other and incidental objects will appear hereinafter.

In the drawings:

Figure 1 is a horizontal sectional view through my improved gear shifting mechanism showing the parts moved to mesh a gear selected, Figure 2 is a view similar to Figure 1, showing the parts moved for neutralizing the gears of a transmission, Figure 3 is a fragmentary top plan view of the device, Figure 4 is a fragmentary end elevation, Figure 5 is a longitudinal sectional view on the line 5—5 of Figure 2, looking in the direction of the arrows, Figure 6 is a transverse sectional view on the line 6—6 of Figure 2, looking in the direction of the arrows, Figure 7 is a transverse sectional view on the line 7—7 of Figure 2, looking in the direction of the arrows, Figure 8 is a fragmentary perspective view of one of the shifters of the device, Figure 9 is a detail sectional view on the line 9—9 of Figure 1, and Figure 10 is a fragmentary horizontal sectional view showing a slight modification of the invention.

In carrying the invention into effect, I employ a casing 10 which, as shown in Figure 5, is bolted to the upper side of a transmission gear case, as conventionally illustrated at 11, over the usual opening therein, ordinary transmission gears being illustrated in dotted lines. Extending longitudinally of the casing are parallel rods 12 fixed against rotation and journaled upon the casing midway between said rods is a rotatable selector shaft 13. Fixed to said shaft at one end of the casing is a pinion 14 and slidable through the casing above and at right angles to the shaft is a rack bar 15 meshing with said pinion. As brought out in Figure 2, the rack bar is, in order that said bar may be readily assembled upon the casing, formed of a central section into the ends of which are threaded the forward and rear sections of the bar and, as shown in detail in Figure 4, the forward section of the bar is offset upwardly at its outer end and is provided with a slot 16. Extending longitudinally of the casing at the adjacent side thereof is a lateral chamber 17 closed by a removable block 18 and extending rearwardly from said chamber is a longitudinally directed barrel 19 closed by a removable cap 20. Upstanding from the top wall of the chamber 17 is a post 21 and mounted to rock upon said post is a bell crank 22 having a long arm and a short arm, the latter arm being provided with a stud 23 engaging in the slot 16 of the rack bar 15. Pivotally connected to the long arm of the bell crank is a rod 24 which may be manually operated for rocking the bell crank and shifting the rack bar longitudinally to rotate the selector shaft 13.

As shown in Figures 5 and 6, the selector shaft is squared throughout the major portion of its length and slidable thereon are companion selectors 25 and 26 provided at their confronting ends with annular channels 27. Extending transversely through the top wall of the casing at the mouth of the chamber 17 are stub shafts 28 and mounted to rock on said shafts are selector levers 29 and 30 provided at their free ends with studs 31 engaging in said channels. At their inner ends, the levers are provided with meshing sectors 32 connecting the levers to swing in opposite directions simultaneously and projecting from the hub of the lever 29 into the chamber 17 are diverging pairs of arms 33. Journaled between one pair of arms is a roller 34 and journaled between the other pair of arms is a similar roller 35. Slidable through the inner end wall of the barrel 19 and through the front wall of the chamber 17 is a plunger rod 36 which, in order that the rod may be readily assembled in position is, as brought out in Figure 1, formed of a central section into the ends of which are threaded the forward and rear sections of the rod. The central section is arranged in position by removing the block 18 when the forward section may then be inserted through the front wall of the chamber 17 and threaded into said section while, by removing the cap 20 of the barrel 19, the rear section of the rod may then be inserted into the barrel and threaded into the rear end of the central section. As shown in Figure 6, the central section is provided with flat sides, one of which rests against the block 18 and formed on said section at the opposite side thereof to cooperate with the rollers 34 and 35 of the lever 29, is a cam 37. Formed on or otherwise secured to the rod at its rear end is a head 38 freely movable in the barrel 19 and surrounding the rod to coact between said head and the inner end wall of the barrel is a spring 39 urging the rod rearwardly. At its forward end, the rod is provided with a slot 40 and extending forwardly from the rod is a second rod 41 slidably connected with the rod 36 by a pin 42 extending through said slot. Formed on the rod 41 at its forward end is a yoke 43 for connection to the clutch pedal of the vehicle in conjunction with which the mechanism is used.

Slidable upon the rods 12 are companion gear shifters 44 and 45 cut away near opposite ends thereof to lighten the weight of said shifters and depending from the shifters into the transmission gear case 11 to engage the slidable gears of the transmission are forks 46. Projecting from the inner sides of the shifters between the inner ends of the selectors 25 and 26, are medially disposed neutralizing forks 47 and 48 freely straddling the selector shaft 13 and formed in the shifters at their outer sides are longitudinally spaced sockets 49. Formed on the side wall of the casing 10 opposite the chamber 17 is a barrel 50 and formed on the opposite side wall of the casing beneath said chamber is, as shown in detail in Figure 9, a similar barrel 51. Slidable in said barrels are detents 52 having spherically shaped heads to bear against the shifters and provided with hollow stems receiving streams 53. Threaded into the barrels at their outer ends are plugs 54 retaining the springs so that the springs will thus function to yieldably urge the detents to engage in the sockets 49 selectively. The shifters are movable along the rods 12, as shall presently be explained, for shifting the speed gears of the transmission and the detents 52 are, therefore, provided for locking the shifters after having been moved as well as also locking the shifters in centralized neutral position, as shown in Figure 2. Mounted upon the shifters near the ends thereof to bear against the selectors 25 and 26, are spring pressed coupling plungers or pawls comprising a low speed plunger 55, a second speed plunger 56, a high speed plunger 57, and a reverse plunger 58. These plungers are all similar to the plungers 52 and are mounted in like manner, the shifters being provided with bosses 59 to accommodate plugs 60 threaded into the bosses to form abutments for the plunger springs. However, it should be noted that the heads of the plungers are provided with flat sides limiting the plungers against rotation. Formed in the periphery of the selector 25 are circumferentially spaced sockets comprising a low speed socket 61 to receive the low speed plunger 55 and a high speed socket 62 to receive the high speed plunger 57. As shown in Figure 7, the selector 26 is formed with similar circumferentially spaced sockets comprising a second speed socket 63 to receive the plunger 56 and a reverse socket 64 to receive the plunger 58. All of these sockets are staggered with respect to each other. The high and second speed sockets 62 and 63 are elongated to accommodate sliding movement of the plungers 56 and 57 endwise of the selectors since in most vehicle transmissions the movement of the sliding gears for second and high is not as long as for low and reverse. However, since endwise travel of the selectors 25 and 26 must be constant for the shifting of the different speed gears, said travel is determined by the throw necessary for the longest movement of the sliding gears. The shortest movement of said gears is accordingly taken care of by elongating said sockets.

As previously stated, the rod 41 is attached to the vehicle clutch pedal and, as will now be noted, when said pedal is released, the spring 39 will function to shift the plunger rod 36 rearwardly with the result that the cam 37 will be caused to coact with the roller 34 for rocking the lever 29. The free ends of the levers 29 and 30 will thus be swung apart so that the selectors 25 and 26 will normally occupy the position shown in Figure 1. On the other hand, the shifters 44 and 45 will normally occupy the centralized neutral position shown in Figure 2, when the gears of the transmission will be in neutral. Under such conditions, it will be assumed that the rod 24 is set to select the low speed gear. When the rod is thus set, the rack bar 15 will, as previously described, be shifted for rotating the selector shaft 13 and turning the selectors 25 and 26 until the socket 61 of the selector 25 is disposed in horizontal alinement with the plunger 55 of the shifter 44. Accordingly, when the clutch pedal is then rocked forwardly, the cam 37 will be moved into engagement with the roller 35 of the lever 29, as shown in Figure 2, for swinging the free ends of the levers 29 and 30 toward each other and shifting the selectors 25 and 26 toward each other along the shaft 13. Thus, when the selectors reach the limit of their inward movement, the plunger 55 will drop into the socket 61 coupling the shifter 44 with said selector so that upon release of the clutch pedal, the spring 39 will function through the medium of the plunger rod 36, cam 37 and roller 34 to swing the free ends of the levers 29 and 30 apart for shifting the selectors away from each other and moving the shifter 44 forwardly to engage the latter low speed gear. When so engaged, the spring 39 will then serve to hold the gear active. In like manner, the rod 24 may be set for rotating the selectors 25 and 26 to select the second, high or reverse gears, or may be set at neutral when no one of the sockets of the selectors will be brought into alinement with any of the plungers so that when the clutch pedal is rocked no gear will be shifted. As brought out in Figure 1, when either of the selectors 25 and 26 is shifted for rendering one of the speed gears of the transmission active, the other of said shifters will remain stationary held by its detent 52.

At this point attention is directed to the fact that the slot 40 in the plunger 36 is of such length that the clutch pedal may be moved forwardly to disengage the clutch without shifting said rod. Accordingly, assuming that one of the speed gears of the transmission is active, the clutch may be disengaged at will and the vehicle stopped, if so desired, without returning said gear to neutral position. However, upon continued forward movement of the clutch pedal, the pin 42 will engage the forward end wall of the slot 40 for pulling the rod 36 forwardly, when the cam 37 will be caused to coact with the roller 35 of the lever 29 to accomplish neutralizing of the transmission. By employing the cam and coacting rollers 34 and 35, movement of the levers 29 and 30 will be accomplished without jump or jerk so that the rod 36 will smoothly slide forwardly under pressure upon the clutch pedal. Furthermore, the rapidity of movement of the levers 29 and 30 to effect shifting of any gear selected, or to effect neutralizing of any gear, may be determined, as desired, by varying the inclination of the cam faces of the cam. The inclination of said cam faces will also, of course, determine the length of travel required of the clutch pedal to effect shifting of any gear selected or for neutralizing the transmission so that such travel may be made relatively short or longer if desired. Normally, the cam 37 will rest against the roller 34, as shown in Figure 1, so that the spring 39 may function to hold any gear selected active and, in this connection, attention is directed to the fact that the cam is of such length that, as shown in Figure 2, after any gear selected has been neutralized, the roller 35 may travel along the front straight face of the cam to permit continued forward movement of the clutch pedal. Thus, the presence of the device upon the vehicle will not hamper or limit free longitudinal movement of the clutch pedal to the limit of its throw or free rearward movement of the clutch pedal.

Assuming now that one of the speed gears of the transmission is active as, for instance, the low speed gear, it will be noted that even though the plunger 55 is engaged in the socket 61 of the selector 25, the rod 24 may, nevertheless, be set for selecting another speed gear of the transmission. When the rod is thus set and the selectors 25 and 26 are rotated, the plunger 55 will ride out of the socket 61 onto the surface of the selector 25 uncoupling the shifter 44 from said selector. However, when the clutch pedal is again rocked forwardly to shift the gear selected, the inner end of the selector 25 will, as the selectors are moved toward each other to the position shown in Figure 2, engage the fork 47 of the shifter 44 and return the shifter to neutral position. A like result would, of course, ensue in connection with the shifter 45 so that, as will be seen, before any selected gear can be shifted to active position, any gear previously selected, as in the case taken, will be neutralized.

In Figure 10 of the drawings, I have illustrated a slight modification of the invention wherein the power spring of the preferred embodiment is eliminated and the clutch spring of the vehicle utilized for shifting the gears. The casing is indicated at 65 and formed thereon is a barrel or bearing 66 similar to the barrel 19, the barrel 66 being closed by a cap 67. Slidable at its rear end in said barrel is a rod 68 received through the forward side wall of the casing and carried by said rod is a cam 69, the rod 68 and cam 69 being similar to the rod 36 and cam 37. The cam is disposed to cooperate with the rollers 34 and 35 of the lever 29 and formed on the rod at its forward end is a yoke 70 to which is pivotally connected a rod 71 attached to the clutch pedal of the vehicle. Thus, when the clutch pedal is released, the rod 68 will be moved rearwardly under the influence of the clutch spring for riding the cam over the roller 34 and shifting any gear selected. As will be observed, the cam will normally stand with its forward end resting upon the roller 34 holding the selected gear in mesh while the clutch pedal may be moved forwardly to disengage the clutch before the cam is brought into contact with the roller 35. Accordingly, the clutch may be disengaged without neutralizing the transmission. However, continued forward movement of the clutch pedal will then serve to ride the cam 69 over the roller 35 for neutralizing the transmission when the forward movement of the clutch pedal may be continued for the full throw of the pedal. Otherwise, this modified structure is identical with the preferred form of the invention and further description is accordingly believed unnecessary.

Having thus described the invention, what is claimed as new is:

1. A gear shifting mechanism including rotatable selecting means movable axially for shifting a selected gear, means for axially shifting said selecting means, and a longitudinally movable element having a cam for actuating said second mentioned means.

2. A gear shifting mechanism including rotatable selecting means movable axially for shifting a selected gear, means for axially shifting said selecting means, a longitudinally movable rod having a cam for actuating said second mentioned means, and a power spring associated with said rod.

3. A gear shifting mechanism including a casing having a barrel, selecting means movable for shifting a selected gear, means for shifting said selecting means, a plunger rod having a head movable in said barrel and provided with a cam for actuating said second mentioned means, and a power spring coacting between said head and the barrel for shifting the rod in one direction.

4. A gear shifting mechanism including rotatable selecting means movable axially for shifting a selected gear, means for axially shifting said selecting means including a lever, and a rectilinearly movable cam to operatively coact with said lever for swinging the lever and actuating said second mentioned means.

5. A gear shifting mechanism including rotatable selecting means movable axially for shifting a selected gear, means for axially shifting said selecting means including a lever, an arm carried by the lever, and a rectilinearly movable cam to operatively coact with said arm for swinging the lever and actuating said second mentioned means.

6. A gear shifting mechanism including selecting means, means including a lever movable in one direction for shifting said selecting means to render a selected gear active and in the opposite direction for shifting said selecting means and neutralizing the gear, arms carried by the lever, and a cam to operatively coact with said arms for swinging the lever in opposite directions and actuating said second mentioned means.

7. A gear shifting mechanism including selecting means, means including a lever movable in one direction for shifting said selecting means to render a selected gear active and in the opposite direction for neutralizing said gear, spaced arms carried by said lever, rollers mounted upon said arms, a plunger rod, a cam carried by said rod, means for shifting the rod in one direction and moving the cam into engagement with one of the rollers for swinging the lever in one direction, and a power spring associated with the rod for shifting the rod in the opposite direction and moving the cam into engagement with the other of said rollers for shifting the lever in the opposite direction.

8. A gear shifting mechanism including rotatable selecting means movable axially for shifting a selected gear, means for axially shifting said selecting means, and a rectilinearly movable cam for actuating said second mentioned means whereby to shift said gear.

9. A gear shifting mechanism including rotatable selecting means movable axially for shifting a selected gear, means for axially shifting said selecting means, and a rectilinearly movable cam to coact with said second mentioned means for shifting said gear and holding the gear active.

10. A gear shifting mechanism including rotatable selecting means movable axially for shifting a selected gear, means for axially shifting said selecting means, a rectilinearly movable cam to coact with said said second mentioned means, and a power device for actuating the cam whereby to shift said gear and hold the gear active.

11. A gear shifting mechanism including rotatable selecting means movable axially in one direction for rendering a selected gear active and in the opposite direction for neutralizing said gear, means operable for axially shifting said selecting means, and a rectilinearly movable cam for operating said second mentioned means.

12. A gear shifting mechanism including rotatable selecting means movable axially in one direction for rendering a selected gear active and in the opposite direction for neutralizing said gear, means for axially shifting said selecting means, a rectilinearly movable cam to coact with said second mentioned means, a power device acting on the cam for shifting the selecting means in the former direction, and means for actuating the cam and shifting said selecting means in the latter direction.

13. A gear shifting mechanism including rotatable selecting means movable axially in one direction for rendering a selected gear active and in the opposite direction for neutralizing said gear, a lever for axially shifting said selecting means, a rectilinearly movable cam to operatively coact with said lever, a power device acting on the cam for shifting the selecting means in the former direction, and means for actuating the cam and shifting said selecting means in the latter direction.

14. A gear shifting mechanism including rotatable selecting means movable axially in one direction for rendering a selected gear active and in the opposite direction for neutralizing said gear, means for axially shifting said selecting means, a rectilinearly movable cam to coact with said second mentioned means, a power device acting on the cam for shifting the selecting means in the former direction, and foot operated means for actuating the cam and shifting said selecting means in the latter direction.

15. A gear shifting mechanism including rotatable selecting means movable axially in one direction for rendering a selected gear active and in the opposite direction for neutralizing said gear, means for axially shifting said selecting means, a rectilinearly movable cam to coact with said second mentioned means, a power spring acting on the cam for shifting the selecting means in the former direction, and means for actuating the cam and shifting said selecting means in the latter direction.

16. A gear shifting mechanism including a casing, rotatable selecting means mounted therein and movable for shifting a selected gear, means for shifting said selecting means, and a slidable plunger rod carried by the casing and formed of detachably connected sections one of which is provided with a cam for actuating said second mentioned means whereby to shift said gear.

17. A gear shifting mechanism including a casing, rotatable selecting means mounted therein and movable for shifting a selected gear, means for shifting said selecting means, a slidable plunger rod carried by the casing and formed of detachably connected sections one of which is provided with a cam for actuating said second mentioned means whereby to shift said gear, and a block carried by the casing to coact with said section of the rod for limiting the rod against rotation.

18. A gear shifting mechanism including a casing, slidable gear shifters mounted therein, rotatable selectors movable in opposite directions for actuating said shifters, means for moving said selectors, plungers slidable upon the shifters to coact with the selectors for coupling the shifters with said selectors, the plungers being provided with tubular stems, springs accommodated in the stems of said plungers, and plugs upon the shifters forming abutments for said springs.

In testimony whereof I affix my signature.

GLENN T. RANDOL. [L. S.]